United States Patent [19]

Shires

[11] Patent Number: 5,311,419

[45] Date of Patent: May 10, 1994

[54] POLYPHASE AC/DC CONVERTER

[75] Inventor: Edwin J. Shires, Rockford, Ill.

[73] Assignee: Sundstrand Corporation, Rockford, Ill.

[21] Appl. No.: 931,169

[22] Filed: Aug. 17, 1992

[51] Int. Cl.[5] .................................... H02M 7/12
[52] U.S. Cl. ................................ 363/65; 363/71; 363/87; 363/129
[58] Field of Search ............... 363/44, 65, 47, 36, 363/41, 87, 129, 71, 17, 98, 131, 132

[56] References Cited

U.S. PATENT DOCUMENTS

| | | | |
|---|---|---|---|
| 3,818,307 | 6/1974 | Hamilton et al. | 363/65 |
| 4,143,414 | 3/1979 | Brewster et al. | 363/44 |
| 4,447,695 | 5/1984 | Inoue | 219/69 C |
| 4,559,685 | 7/1986 | Hombu et al. | 363/41 |
| 4,677,366 | 6/1987 | Wilkinson et al. | 323/222 |
| 4,680,689 | 7/1987 | Payne et al. | 363/26 |
| 4,680,692 | 7/1987 | Carron | 363/98 |
| 4,739,466 | 4/1988 | Glennon et al. | 363/89 |
| 4,779,182 | 10/1988 | Mickal et al. | 363/37 |
| 4,816,982 | 3/1989 | Severinsky | 363/44 |
| 4,833,586 | 5/1989 | Inaba et al. | 363/41 |
| 4,940,929 | 7/1990 | Williams | 323/222 |
| 4,963,029 | 10/1990 | Severinsky et al. | 363/80 |
| 5,055,989 | 10/1991 | Carroll et al. | 363/36 |
| 5,081,570 | 1/1992 | Chibani et al. | 363/17 |
| 5,105,351 | 4/1992 | Harada et al. | 363/65 |

FOREIGN PATENT DOCUMENTS 58-179168 10/1983 Japan .
2-36765 2/1990 Japan .

OTHER PUBLICATIONS

A paper by Manias, et al., entitled "A Novel Sinewave in AC to DC Converter with High-Frequency Transformer Isolation", appearing in *IEEE Transactions on Industrial Electronics,* vol. IE-32, No. 4, Nov. 1985.

A paper by Manias, et al., entitled "A 3-Phase Inductor Fed SMR Converter With High Frequency Isolation, High Power Density and Improved Power Factor", pp. 253–263, copyright 1987, IEEE.

A paper by Diego, et al., entitled "A Novel Load Current Control Method for a Leading Power Factor Voltage Source PWM Rectifier", pp. 383–388, copyright 1992, IEEE.

A paper by Werneknick, et al. entitled "A High Frequency AC/DC Converter With Unity Power Factor and Minimum Harmonic Distortion", pp. 264–270, copyright 1987, IEEE.

Article by Manias, et al. entitled "An AC to DC Converter with Improved Input Power Factor and High Power Density", pp. 649–656, copryight 1985, IEEE.

*Primary Examiner*—Steven L. Stephan
*Assistant Examiner*—Adolf Berhane
*Attorney, Agent, or Firm*—Marshall, O'Toole, Gerstein, Murray & Bicknell

[57] ABSTRACT

A power converter for converting input AC power comprising N phase-to-phase input AC waveforms at a first frequency into overall output DC power, where N is an integer greater than two, includes N phase-to-phase AC/DC converters each receiving a phase-to-phase waveform and having outputs connected in series whereby the converter outputs are combined to develop the overall output DC power. The AC/DC converters are operated such that a parameter of the input AC power and a parameter of the overall output DC power are controlled.

13 Claims, 4 Drawing Sheets

POLYPHASE AC/DC CONVERTER

TECHNICAL FIELD

The present invention relates generally to power converters, and more particularly to a power converter for converting N-phase AC power into DC power.

BACKGROUND ART

Often, there is a need to convert polyphase AC power into DC power for one or more loads. For example, in an aircraft, provision is often made to convert polyphase 400 Hz AC power supplied by a ground power cart into DC power for on-board loads while the aircraft is on the ground. This AC/DC power conversion may be accomplished by multiple rectifiers connected together in a bridge configuration. However, the currents drawn by such rectifiers are non-sinusoidal and contain high levels of low order harmonics. These harmonic currents can cause high levels of voltage distortion in the waveforms produced by the AC source and hence it has been found necessary to limit the magnitudes of these currents in some fashion.

In the past, AC input harmonic filters have been used to reduce the harmonic currents on the input side of the converter. Alternatively, a rectifier topology employing multiple bridge rectifiers and isolation transformers has been used. This latter approach has been found to be particularly desirable owing to the need to isolate the input of the converter from the output for safety reasons. However, in both approaches, the added components have significantly increased the size and weight of the overall converter, and hence have limited the usefulness of these approaches in applications where size and weight must be kept to a minimum, such as in aircraft.

A different approach is to rectify the polyphase AC power utilizing controllable switching devices instead of uncontrolled diodes. A phase controlled rectifier bridge is one example of a converter that adopts this approach.

A rectifier bridge utilizing a plurality of naturally commutated controlled thyristors, however, can present poor input power factor to the AC source, and hence the AC input source must have a greater capacity than if the bridge could present a unity power factor load thereto.

A further example of an AC/DC converter using controllable switching devices is disclosed in Brewster et al., U.S. Pat. No. 4,143,414. In this patent, three separate single-phase AC/DC converters receive phase-to-phase voltages developed by a three-phase voltage source. Each AC/DC converter includes a first full-wave rectifier which converts the phase-to-phase AC voltage into a DC voltage and an H-bridge converter coupled to the first full-wave rectifier. The H-bridge converter includes first and second pairs of thyristors which are alternately operated and which are coupled to a primary winding of an isolation transformer. A secondary winding of the isolation transformer is coupled to a second full-wave rectifier bridge. The second full-wave rectifier bridges of the AC/DC converters are connected together in parallel to form an output of the overall converter. One disadvantage with the converter shown in the Brewster et al. patent is that the thyristors are not self-commutating and therefore require a resonant commutation circuit for proper operation. This resonant commutation circuit undesirably increases the size and weight of the overall converter. Also, the independent operation of the three converters does not guarantee matching of the supply currents to each, and therefore the triplen harmonics may not cancel perfectly.

A paper by Manias, et al. entitled "Novel Sinewave in AC to DC Converter With High-Frequency Transformer Isolation", appearing in *IEEE Transactions on Industrial Electronics*, Vol. IE-32, No. 4, November 1985, discloses an AC/DC converter utilizing a cycloconverter connected between an AC power source and a high-frequency transformer and a full bridge rectifier coupled between the high frequency transformer and an output of the converter.

A paper by Manias, et al. entitled "A 3-Phase Inductor Fed SMR Converter With High Frequency Isolation, High Power Density and Improved Power Factor", pp 253–263, copyright 1987, *IEEE*, discloses a two-stage, inductor fed switch mode rectifier (SMR) topology wherein a three-phase AC power source is coupled to a PWM rectifier, a high frequency inverter, an isolation transformer and a diode rectifier. A phase comparator is responsive to the voltage and current in one of the phases of the AC power source and provides a command signal to a PWM gate control logic circuit which in turn operates switches in the PWM rectifier to control the power factor of the converter and regulate the DC output voltage. The PWM gate control logic circuit also operates switches in the high frequency inverter at a fixed duty cycle of 50%.

A paper by Diego, et al. entitled "A Novel Load Current Control Method for a Leading Power Factor Voltage Source PWM Rectifier", pp 383–388, copyright 1992, *IEEE*, discloses a PWM voltage source rectifier including an input transformer coupled to an AC source, an input filter coupled to the transformer and a switching rectifier. The switches of the rectifier are controlled in accordance with a fixed PWM pattern based upon the detected DC current and AC voltage to control the power angle and hence the amount of power flow transferred from the AC/DC side.

Other patents and publications disclosing AC/DC converters include: Hombu et al., U.S. Pat. No. 4,599,685; Wilkinson et al., U.S. Pat. No. 4,677,366; Glennon et al., U.S. Pat. No. 4,739,466; Severinsky, U.S. Pat. No. 4,816,982; Williams, U.S. Pat. No. 4,940,929; Severinsky et al., U.S. Pat. No. 4,964,029; Ampo, Japanese Patent Publication 58-179168; Fujii, Japanese Patent Publication 2-36765; and an article by Wernekinck, et al. entitled "A High Frequency AC/DC Converter With Unity Power Factor and Minimum Harmonic Distortion", pp 264–270, copyright 1987, *IEEE*.

SUMMARY OF THE INVENTION

In accordance with the present invention, an AC/DC power converter provides complete cancellation of controlled harmonics, and controls the input power factor and output voltage in a simple and effective fashion.

More particularly, according to one aspect of the present invention, a power converter for converting input AC power comprising N phase-to-phase input AC waveforms at a first frequency into overall output DC power, where N is an integer greater than 2, includes N phase-to-phase AC/DC converters each receiving a phase-to-phase waveform and having outputs connected in series. Each AC/DC converter includes first means for rectifying the phase-to-phase waveform to obtain intermediate DC power, means coupled to the first rectifying means for converting the intermediate DC power into intermediate AC power at a second frequency greater than the first frequency and second means for rectifying the intermediate AC power to obtain converter output DC power. The converter output DC powers are combined to develop the overall output DC power and means are provided for operating the N phase-to-phase AC/DC converters whereby a parameter of the input AC power and a parameter of the overall output DC power are controlled.

Preferably, each converting means includes a controllable switch and the operating means includes a pulse-width modulator coupled to the switches wherein each switch develops pulses in the intermediate AC power produced thereby. Also preferably, the intermediate DC power produced by each AC/DC converter includes an AC component at a multiple of the first frequency and the pulses in the intermediate AC power produced by each AC/DC converter are synchronized to the first frequency.

In accordance with a highly preferred form of the present invention, the operating means operates the controllable switches such that the AC/DC converters present a substantially unity power factor load to an AC power source developing the input AC power. Also in accordance with the highly preferred form of the invention, the operating means operates the controllable switches such that a DC output voltage of the power converter is regulated.

In accordance with the preferred embodiment, the operating means includes a summer for summing a signal representing the DC output voltage with a reference to derive an error signal, a command circuit responsive to the error signal for developing a command signal representing a commanded depth of modulation for the controllable switches and a pattern generator responsive to the command signal for developing pulse-width modulated control signals for the controllable switches. Also preferably, the pattern generator is further responsive to a synchronization signal developed by a phase locked loop (PLL) wherein the PLL is responsive to a frequency reference signal.

The converting means of each AC/DC converter preferably comprises an H-bridge inverter and an isolation transformer coupled between the H-bridge inventer and the second rectifying means.

In accordance with another aspect of the present invention, a power converter for converting input AC power produced by an AC power source and comprising N phase-to-phase voltages at a first frequency into an overall DC output voltage, where N is an integer greater than 2, includes N phase-to-phase AC/DC converters each receiving a phase-to-phase voltage and having outputs connected in series. Each AC/DC converter includes a first full-wave rectifier for rectifying the phase-to-phase waveform to obtain intermediate DC power, an H-bridge inverter coupled to the first full-wave rectifier having controllable power switches for converting the intermediate DC power into intermediate AC power at a second frequency at least an order of magnitude greater than the first frequency and a second full-wave rectifier for rectifying the intermediate AC power to obtain a converter DC output voltage. The converter DC output voltages are combined to develop the overall DC output voltage and means are provided for operating the controllable power switches in each H-bridge inverter whereby the power converter presents substantially a unity power factor load to the AC power source and whereby the DC output voltage is regulated.

The converter of the present invention provides isolation between the input and output thereof, presents a unity power factor load to an AC power source coupled thereto, minimizes distortion in the AC power produced thereby and provides a regulated DC output.

DESCRIPTION OF THE PREFERRED EMBODIMENTS

Figure 1:
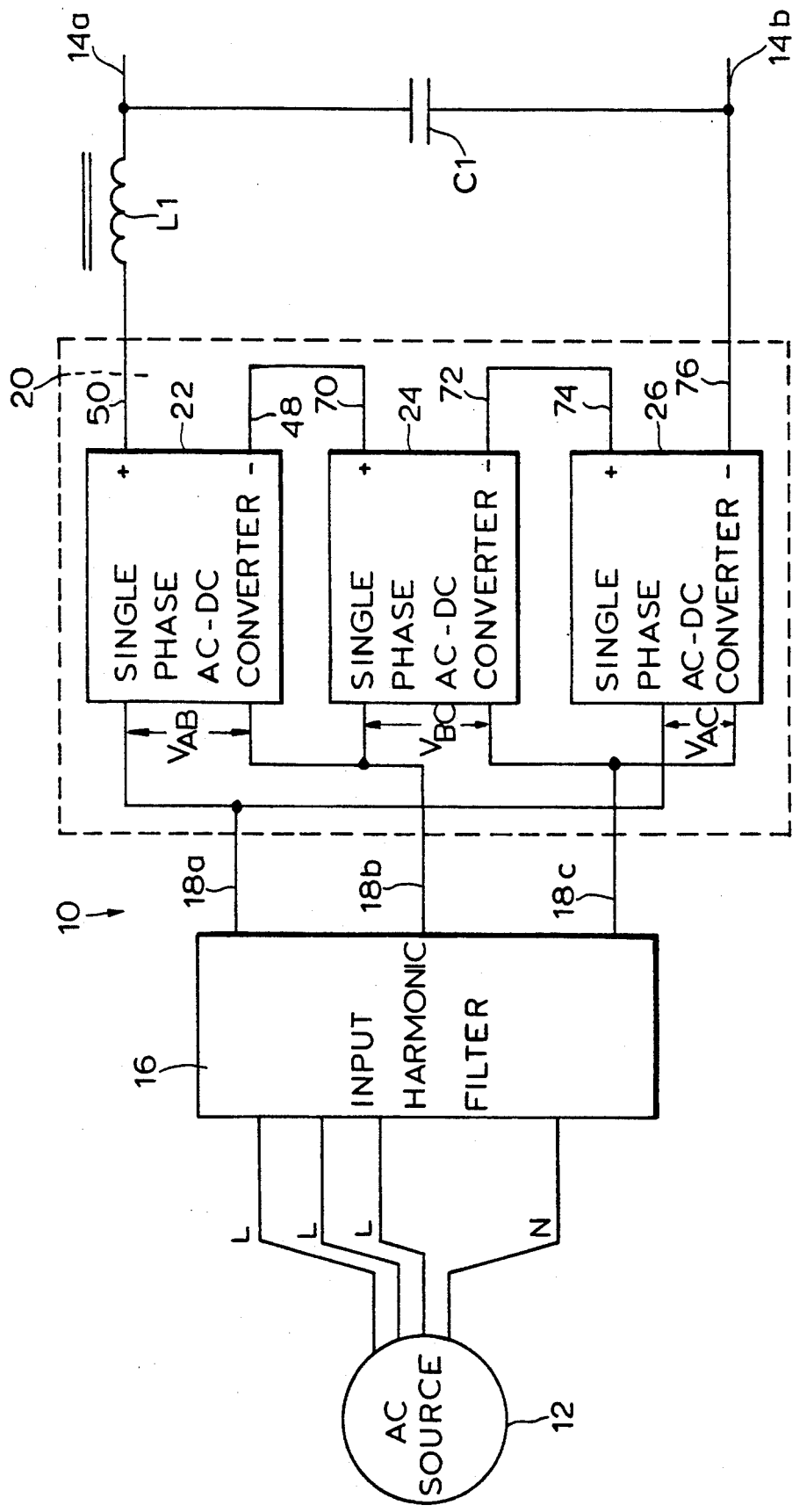
FIG. 1 comprises a simplified block diagram of a power converter according to the present invention.

Referring now to FIG. 1, an AC/DC power conversion system 10 converts AC power produced by an AC source 12 into DC power on DC conductors 14a, 14b. The AC source 12 is coupled to an input harmonic filter 16, described in greater detail in connection with FIG. 5 hereinafter, and filtered phase-to-neutral voltages appearing on lines 18a, 18b, 18c are provided to a three-phase AC/DC power converter 20. The DC power developed by the converter 20 is supplied via DC filter components including an inductor L1 and a capacitor C1 to the DC output lines 14a, 14b.

The converter 20 includes three single-phase AC/DC converters 22, 24 and 26. However, it should be noted that the present invention is not limited to use with a three-phase AC source; rather, an N-phase AC source may supply N-phase AC power to a converter having N single-phase AC/DC converters, where N is an integer greater than two.

Each converter 22, 24 and 26 receives a phase-to-phase voltage or waveform developed across pairs of the lines 18a-18c. Thus, the converter 22 receives a voltage $V_{AB}$ appearing across the lines 18a, 18b while the converter 24 receives a voltage $V_{BC}$ appearing across the lines 18b, 18c. In like fashion, the converter 26 receives a voltage $V_{AC}$ appearing across the lines 18a, 18c.

Figure 2:
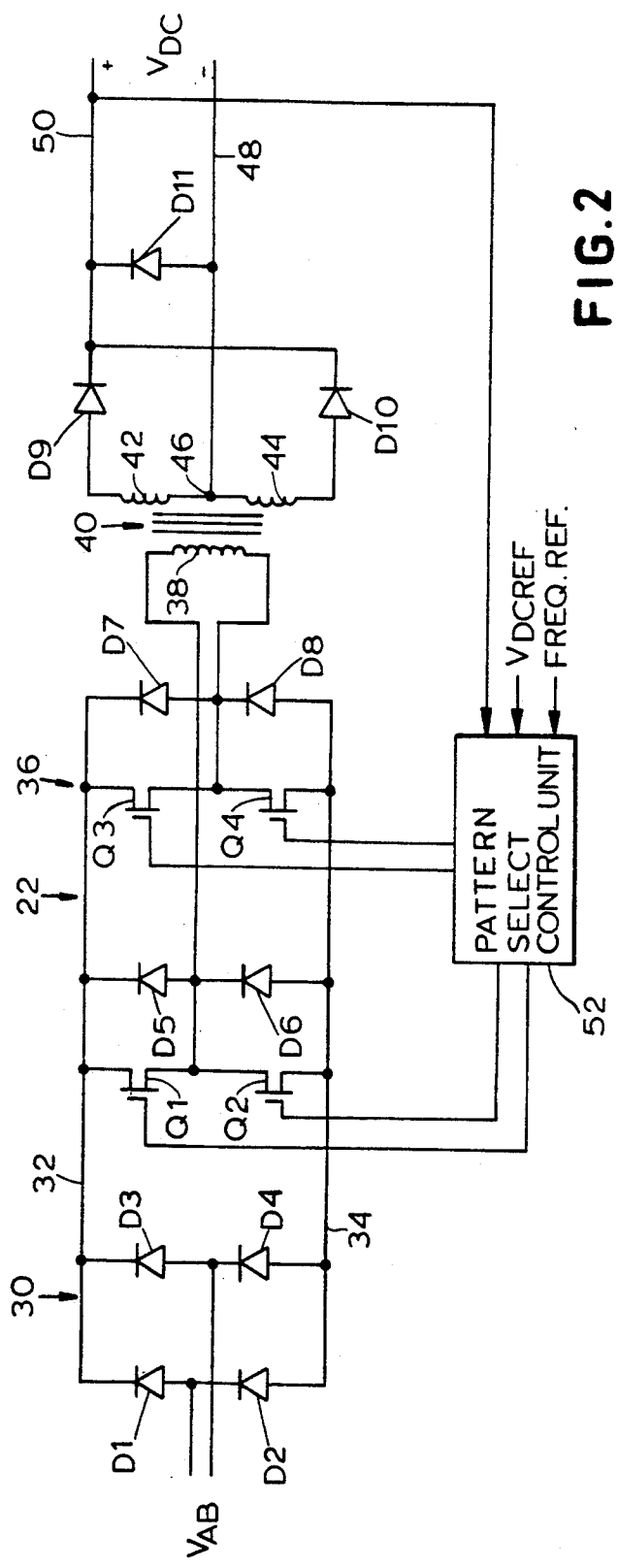
FIG. 2 comprises a combined simplified schematic and block diagram of the converter of FIG. 1.

Referring now to FIG. 2, the converters 22, 24 and 26 are identical to one another, and hence only the converter 22 will be described in detail. The converter 22 includes a first full-wave rectifier 30 comprising diodes D1-D4 connected in a conventional full bridge configuration which rectify the phase-to-phase voltage $V_{AB}$ into intermediate DC power on first and second DC link conductors 32, 34. The intermediate DC power includes AC components at even multiples of the AC frequency provided on the lines 18a-18c. The intermediate DC power is inverted by a high frequency H-bridge inverter 36 having first through fourth power switches in the form of MOSFET's Q1-Q4 and associated flyback diodes D5-D8. In the preferred embodiment, diametrically opposite pairs of power switches Q1, Q4 and Q2, Q3 are alternately operated at a 50% duty cycle to produce AC power in a primary winding 38 of an isolation transformer 40. The frequency of operation of the switches Q1-Q4 is greater than the frequency of the AC power supplied to the full-wave rectifier 30 so that the size of the isolation transformer 40 may be kept as small as possible. Preferably, the frequency of the power supplied by the AC source 12 is 400 hz. and the frequency of the intermediate AC power induced in the primary winding 38 is at least one and preferably several orders of magnitude greater than 400 hz., for example 50 khz. to 100 khz.

The isolation transformer 40 includes first and second secondary windings 42, 44 which are connected in series between a pair of diodes D9, D10. A mid-tap 46 between the windings 42, 44 is connected to a negative DC output line 48 while the diodes D9 and D10 together with a diode D11 full-wave rectify the intermediate AC power. The full-wave rectified power is supplied on a line 50 relative to the voltage on the line 48.

Figure 3:
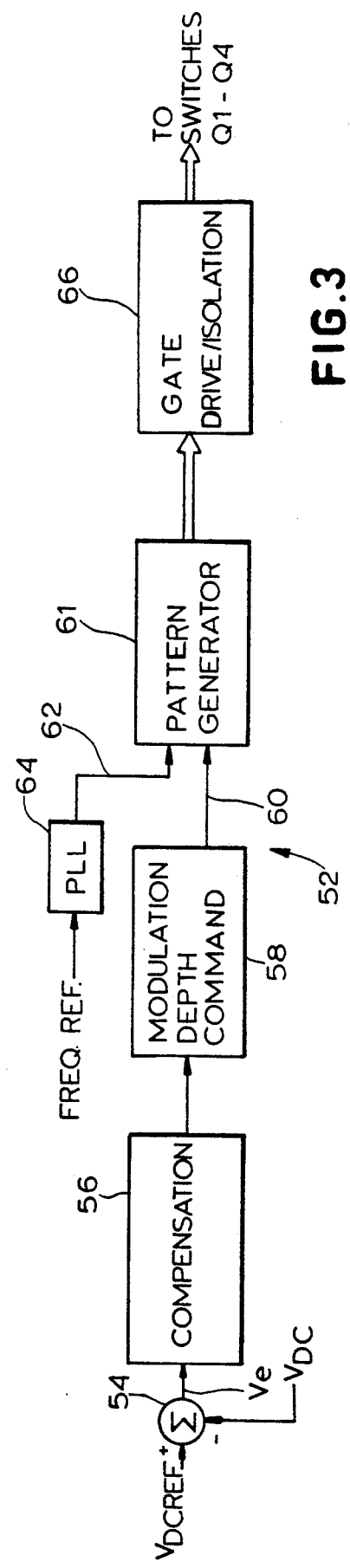
FIG. 3 comprises a block diagram of the pattern select control unit of FIG. 2.

The switches Q1-Q4 of the H-bridge inverter 36, as well as corresponding switches in the converters 24 and 26, are operated by a pattern select control unit 52 in accordance with the sensed voltage on the line 50, a reference $V_{DC\,REF}$ representing the desired output voltage of the converter 22 and a frequency reference FREQ. REF. representing the frequency of operation of the switches Q1-Q4. As seen in FIG. 3, the control unit 52 includes a summer 54 which subtracts the voltage $V_{DC}$ across the lines 48, 50 from the reference $V_{DC\,REF}$ to obtain an error signal $V_c$. The error signal $V_c$ is processed by a compensation unit 56 which may include integral and/or gain terms and the compensated error signal is provided to a depth of modulation command circuit 58. The circuit 58 develops a command signal on a line 60 representing the depth of modulation required for the switches Q1-Q4 to maintain the output voltage $V_{DC}$ at a regulated level. A pattern generator 61 receives the signal on the line 60 as well as a frequency command signal on a line 62 developed by a phase locked loop (PLL) 64 which is responsive to the frequency reference signal FREQ. REF. The pattern generator 61 develops the PWM patterns for the switches Q1-Q4 and such patterns are processed by a gate drive/isolation circuit 66 and provided to the gate electrodes of the switches Q1-Q4.

In the preferred embodiment, the pattern generator may be a memory which stores a plurality of PWM waveforms each represented by a series of zeroes and ones in contiguous memory locations. One of the waveforms is selected by the output of the command circuit 58 and the phase and frequency of the retrieved PWM waveform is controlled by a converter coupled between the line 62 and the generator 61 wherein the converter develops addresses to sequentially access memory locations in the memory. The generator 61 may be implemented by a different arrangement of elements, if desired.

Referring again to FIG. 1, the outputs of the converters 22, 24 and 26 are connected in series. Thus, the negative output line 48 of the converter 22 is connected to a positive output line 70 of the converter 24 while a negative output line 72 of the converter 24 is connected to a positive output line 74 of the converter 26. The positive output line 50 of the converter 22 and a negative output line 76 of the converter 26 are connected to the lines 14a, 14b through the DC filter comprising the inductor L1 and the capacitor C1.

Figure 4:
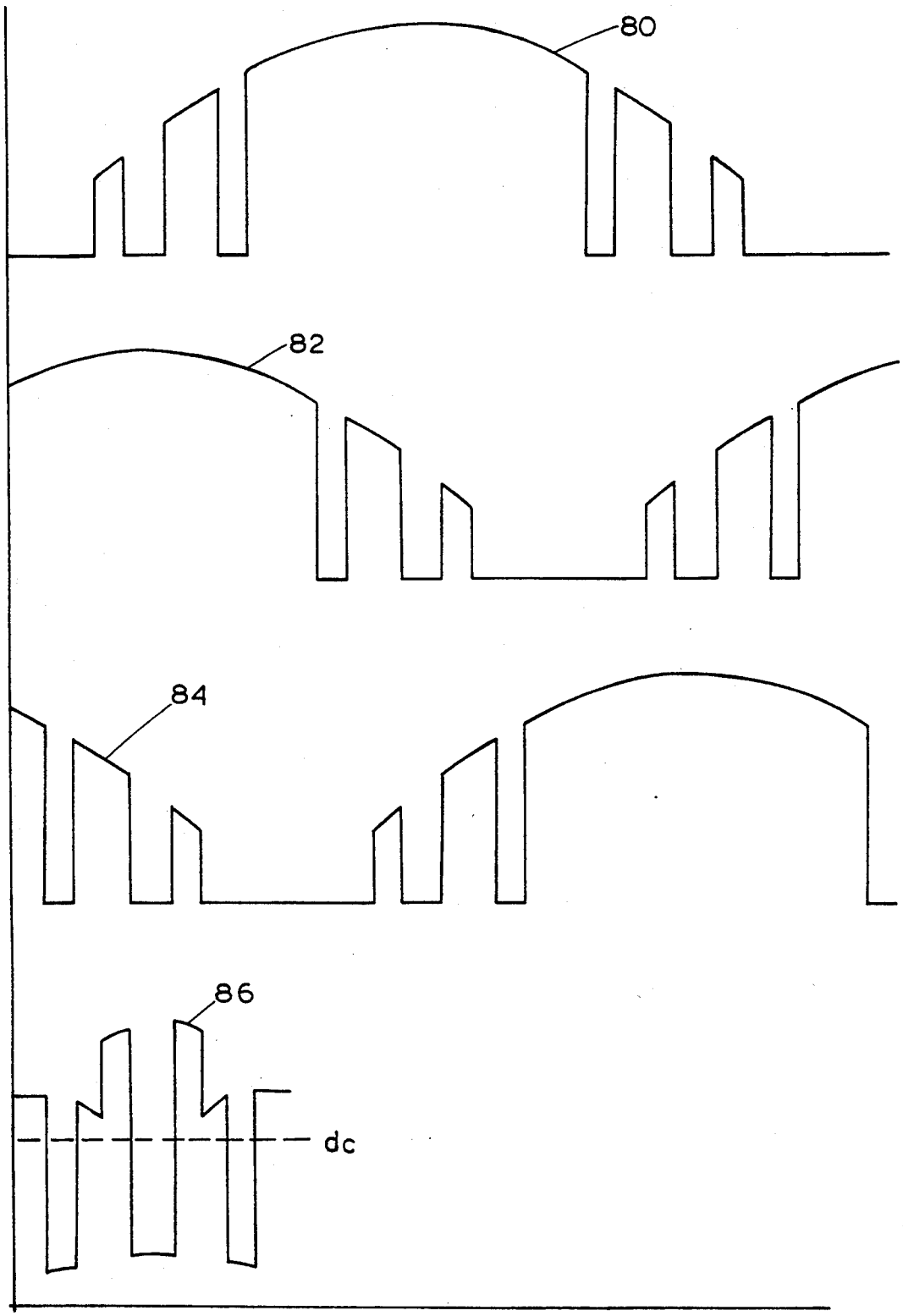
FIG. 4 comprises a series of waveform diagrams illustrating the operation of the power converter of FIGS. 1-3.

FIG. 4 illustrates the waveforms produced by the converter of FIG. 1. The operation of the inverter switches Q1-Q4 is synchronized to the frequency of the AC power produced by the input AC power source 12. Because the DC load can effectively be regarded as a constant current, the current drawn by the inverter 36 is a series of pulses of uniform height. The action of the full-wave rectifier 30 comprising the diodes D1-D4 inverts the current pulse train drawn from the AC source on alternate half cycles. The resultant AC source current drawn by the rectifier 30 is a tri-state waveform wherein all low order harmonic coefficients are adjustable using known PWM techniques. By selection of an appropriate PWM pattern, the conversion ratio of the AC/DC converter, and hence the DC output voltage, can be continuously adjusted at a regulated value or values while eliminating low order harmonics from the AC source current waveform.

The secondary of the transformer is center tapped to allow full-wave rectification using the two diodes D9 and D10. When the high frequency AC waveform produced in the secondary windings 42, 44 is rectified by the diodes D9 and D10, an amplitude modulated PWM pulse train is produced as shown by the waveform 80 of FIG. 4. The waveform 80 illustrates the synchronization of the PWM switching under the assumption that five pulses per half-cycle of the input AC power are to be produced by the inverter 36. If desired, a greater number of pulses per half-cycle could be used.

Owing to the series connection of the converters 22, 24 and 26, the waveform 80 is combined with a waveform 82, representing the output of the converter 24, and a waveform 84, representing the output of the converter 26, to obtain an overall output 86 which is filtered by the filter components L1 and C1 to produce a DC output having a relatively low ripple amplitude. The series connection of the three single-phase converter outputs forces the magnitudes of current drawn by each converter 22, 24 and 26 to match exactly, and insures that the three-phase load is perfectly balanced.

Because the three single-phase converters 22, 24 and 26 are delta-connected, triplen harmonic currents flowing in the input rectifier of such converters are completely canceled and are not seen in the AC line currents in the harmonic filter 16. For this reason, it is not necessary to cancel triplen harmonics using the PWM patterns.

Figure 5:
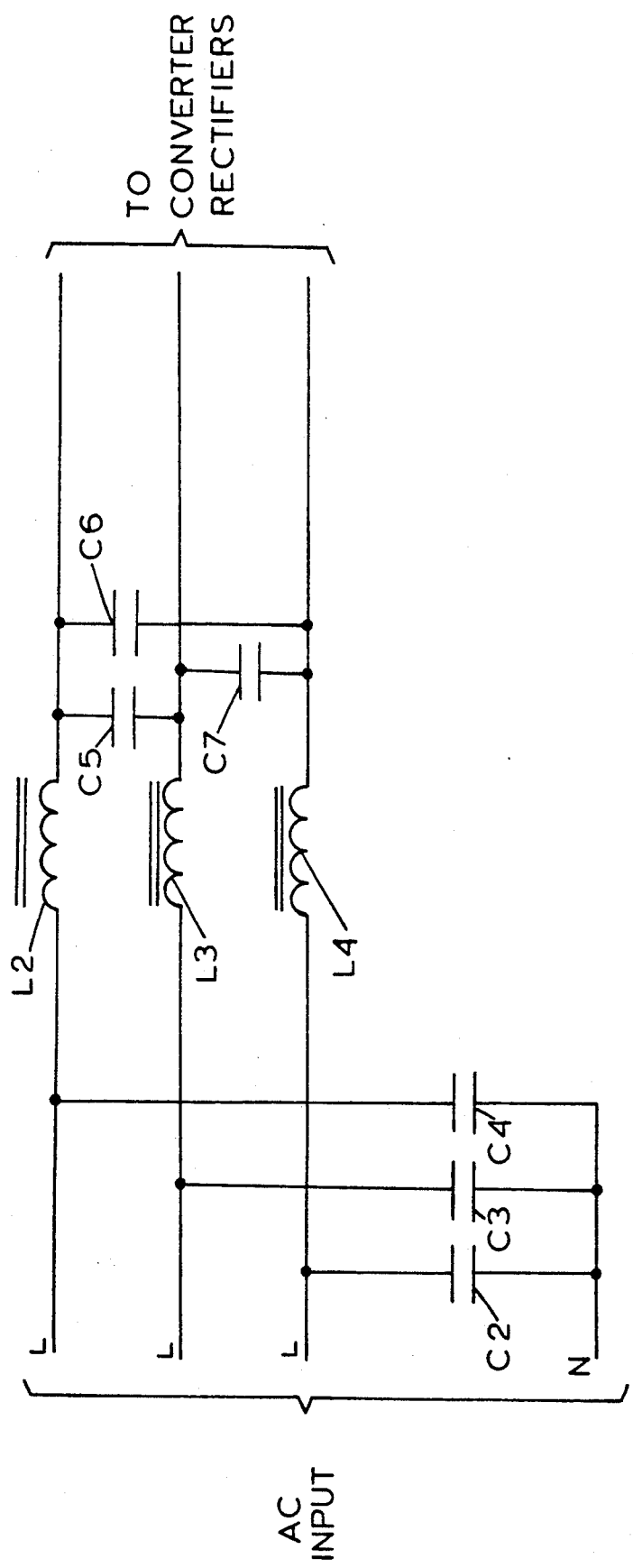
FIG. 5 comprises a schematic diagram of the input harmonic filter of FIG. 1.

Referring now to FIG. 5, the AC input harmonic filter 16 must attenuate the harmonics produced by the PWM switching while providing a low source impedance to the chopping frequency of the inverter. The filter shown in FIG. 5 is a three-phase, pi-type filter that meets these design criteria. Capacitors C2-C4 are connected between the input phases and neutral and further capacitors C5-C7 are connected between the phases. Line inductors L2-L4 provide series impedances to improve the attenuation of high frequencies.

The DC output filter may be the simple LC type shown in the Figs., or may be a multi element design that provides notches in the frequency response for a specific frequency, for example the chopping frequency of the inverter. The exact form of the DC filter depends largely on the characteristics of the load and the DC power quality requirement.

In summary, the converter of the present invention provides various advantages. The input power factor can be maintained near unity and distortion in the AC input power is minimized. Isolation between the input and the output of the converter is provided and the DC output can be regulated at a desired level. By connecting the outputs of the single-phase AC/DC converters in series, the currents drawn by each converter are perfectly matched so that the load presented to the AC power source is perfectly balanced. Triplen harmonic currents flowing in the input rectifier are canceled completely and hence need not be canceled by the PWM patterns provided to the converters.

While the present converter is not as efficient as previous designs, the foregoing advantages result in a converter which is small and light in weight. This makes the present converter particularly desirable in aircraft installations where the converter must be installed on-board the aircraft even though it is used typically only when the aircraft is on the ground.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A power converter for converting input AC power comprising N phase-to-phase input AC waveforms at a first frequency into overall output DC power, where N is an integer greater than two, comprising:
   N phase-to-phase AC/DC converters each receiving a phase-to-phase waveform and having outputs connected in series including
      first means for rectifying the phase-to-phase waveform to obtain intermediate DC power,
      means coupled to the first rectifying means for converting the intermediate DC power into intermediate AC power at a second frequency greater than the first frequency and
      second means for rectifying the intermediate AC power to obtain converter output DC power;
   wherein the converter output DC powers are combined to develop the overall output DC power; and
   means for operating the N phase-to-phase AC/DC converters whereby a parameter of the input AC power and a parameter of the overall output DC power are controlled.

2. The power converter of claim 1, wherein each converting means includes a controllable switch and the operating means includes a pulse-width modulator coupled to the switches wherein each switch develops pulses in the intermediate AC power produced thereby.

3. The power converter of claim 2, wherein the intermediate DC power produced by each AC/DC converter includes an AC component at a multiple of the first frequency and wherein the pulses in the intermediate AC power produced by each AC/DC converter are synchronized to the first frequency.

4. The power converter of claim 3, wherein the input AC power is developed by an AC power source and wherein the operating means operates the controllable switches such that the AC/DC converters present a substantially unity power factor load to the AC power source.

5. The power converter of claim 3, wherein the operating means operates the controllable switches such that a DC output voltage of the power converter is regulated.

6. The power converter of claim 5, wherein the operating means includes a summer for summing a signal representing the DC output voltage with a reference to derive an error signal, a command circuit responsive to the error signal for developing a command signal representing a commanded depth of modulation for the controllable switches and a pattern generator responsive to the command signal for developing pulse-width modulated (PWM) control signals for the controllable switches.

7. The power converter of claim 6, wherein the pattern generator is further responsive to a synchronization signal developed by a phase-locked loop (PLL) wherein the PLL is responsive to a frequency reference signal.

8. The power converter of claim 1, wherein the converting means of each AC/DC converter comprises an H-bridge inverter and an isolation transformer coupled between the H-bridge inverter and the second rectifying means.

9. A power converter for converting input AC power produced by an AC power source and comprising N phase-to-phase voltages at a first frequency into an overall DC output voltage, where N is an integer greater than two, comprising:
   N phase-to-phase AC/DC converters each receiving a phase-to-phase voltage and having outputs connected in series including
      a first full-wave rectifier for rectifying the phase-to-phase waveform to obtain intermediate DC power,
      an H-bridge inverter coupled to the first full-wave rectifier having controllable power switches for converting the intermediate DC power into intermediate AC power at a second frequency at least an order of magnitude greater than the first frequency and
      a second full-wave rectifier for rectifying the intermediate AC power to obtain a converter DC output voltage;
   wherein the converter DC output voltages are combined to develop the overall DC output voltage; and
   means for operating the controllable power switches in each H-bridge inverter whereby the power converter presents substantially a unity power factor load to the AC power source and whereby the DC output voltage is regulated.

10. The power converter of claim 9, wherein each H-bridge inverter includes an isolation transformer coupled between the switches and the second rectifying means thereof.

11. The power converter of claim 10, wherein the isolation transformer of each H-bridge inverter includes a primary winding coupled to the switches and a secondary winding coupled to the second full-wave rectifier of the H-bridge inverter.

12. The power converter of claim 11, wherein the operating means includes a summer for summing a signal representing the DC output voltage with a reference to derive an error signal, a command circuit responsive to the error signal for developing a command signal representing a commanded depth of modulation for the switches of each H-bridge inverter and a pattern generator responsive to the command signal for developing pulse-width modulated (PWM) control signals for the switches of each H-bridge inverter.

13. The power converter of claim 12, wherein the pattern generator is further responsive to a synchronization signal developed by a phase-locked loop (PLL) wherein the PLL is responsive to a frequency reference signal.

* * * * *